United States Patent
Tartavull et al.

(10) Patent No.: US 8,225,986 B2
(45) Date of Patent: Jul. 24, 2012

(54) CASING FOR ELECTRONIC KEY AND SYSTEM COMPRISING SUCH A CASING

(75) Inventors: Philippe Tartavull, Malibu, CA (US);
Marc Bertin, La Celle les Bordes (FR);
Jean-Marc Meslin, Deuil la Barre (FR)

(73) Assignee: Oberthur Technologies (FR)

( * ) Notice: Subject to any disclaimer, the term of this patent is extended or adjusted under 35 U.S.C. 154(b) by 456 days.

(21) Appl. No.: 12/307,313

(22) PCT Filed: Jun. 19, 2007

(86) PCT No.: PCT/EP2007/056089
§ 371 (c)(1),
(2), (4) Date: Sep. 25, 2009

(87) PCT Pub. No.: WO2008/003586
PCT Pub. Date: Jan. 10, 2008

(65) Prior Publication Data
US 2010/0193583 A1    Aug. 5, 2010

(30) Foreign Application Priority Data
Jul. 4, 2006   (FR) ..................................... 06 06062

(51) Int. Cl.
*G06F 17/00* (2006.01)
(52) U.S. Cl. ........ 235/375; 235/380; 235/486; 235/492; 439/55; 439/159; 439/638; 439/660
(58) Field of Classification Search ................. 235/375, 235/380, 486, 492; 439/55, 159, 638, 660
See application file for complete search history.

(56) References Cited

U.S. PATENT DOCUMENTS

| | | | |
|---|---|---|---|
| 2001/0006855 A1* | 7/2001 | Koitsalu ..................... | 439/188 |
| 2004/0089717 A1 | 5/2004 | Harari et al. | |
| 2004/0145878 A1* | 7/2004 | Wang .......................... | 361/785 |
| 2005/0085133 A1* | 4/2005 | Wang et al. ................. | 439/660 |
| 2005/0109841 A1* | 5/2005 | Ryan et al. .................. | 235/380 |
| 2005/0233623 A1* | 10/2005 | Matsumoto et al. ......... | 439/142 |
| 2005/0274803 A1 | 12/2005 | Lee | |
| 2006/0208066 A1* | 9/2006 | Finn et al. ................... | 235/380 |
| 2006/0223352 A1* | 10/2006 | Wada et al. ................. | 439/159 |

(Continued)

FOREIGN PATENT DOCUMENTS

FR   2793575 A1   11/2000

(Continued)

*Primary Examiner* — Allyson Trail
(74) *Attorney, Agent, or Firm* — Lowe Hauptman Ham & Berner, LLP

(57) ABSTRACT

This USB memory key casing exhibits an accessory accommodation housing (6) for a chip microcard (7) independent of the electronic components (4, 5) of the USB memory key. It allows the owner of a USB key and of a chip microcard (7) to have available a convenient location for accommodating the chip microcard (7). It also makes it possible to associate, in one and the same packaging, while being separable, an intelligent chip microcard and an electronic key that are dedicated to transactions pertaining to one and the same banking or other service, one by way of a specialized reading terminal hooked up to the computer system of the provider of the service and the other by way of a host electronic apparatus linked to the Internet network.

26 Claims, 2 Drawing Sheets

| U.S. PATENT DOCUMENTS | | | | | FOREIGN PATENT DOCUMENTS | | |
|---|---|---|---|---|---|---|---|
| 2009/0093136 A1* | 4/2009 | Hiew et al. | 439/55 | WO | 03102752 A1 | 12/2003 |
| 2009/0095817 A1* | 4/2009 | Amiot et al. | 235/486 | WO | 2005008453 A1 | 1/2005 |
| 2009/0124129 A1* | 5/2009 | Moshayedi | 439/638 | WO | 2006048515 A1 | 5/2006 |
| 2010/0112840 A1* | 5/2010 | Maruyama | 439/159 | * cited by examiner | | |

CASING FOR ELECTRONIC KEY AND
SYSTEM COMPRISING SUCH A CASING

CROSS-REFERENCE TO RELATED
APPLICATIONS

The present Application is based on International Application No. PCT/EP2007/056089, filed on Jun. 19, 2007, which in turn corresponds to French Application No. 06 06062 filed on Jul. 4, 2006, and priority is hereby claimed under 35 USC §119 based on these applications. Each of these applications are hereby incorporated by reference in their entirety into the present application.

DOMAIN OF THE INVENTION

The present invention relates to chip cards and electronic keys such as USB memory keys used for transporting and storing computer data.

Chip cards are cards comprising one or more electronic components of integrated circuit or MEMS type ("Micro-ElectroMechanical System"). Two types exist: "memory" cards and chip cards termed "intelligent chip cards".

Memory cards are removable units for storing computer data. Their electronic components enclose a memory of EPROM type ("Electronically Programmable Read-Only Memory") or EEPROM type ("Electrically Erasable Programmable Read-Only Memory") associated with a specialized microprocessor termed a microcontroller ensuring management of the memory for data exchanges with the outside by way of electrical contact pads. They are presented in card formats of very small dimensions, of the order of those of a postage stamp, for uses within portable electronic apparatus such as digital cameras.

Intelligent chip cards provide security in the execution of secure banking or other transactions. They are of the same nature as memory cards but are designed to store a secure-transaction management program and to control the execution thereof through a computer system provided with a suitably adapted communication terminal termed a chip card reader. Intelligent chip cards can be powered with electrical energy and can communicate by means of an antenna. They then comprise an antenna and may or may not be provided with electrical contact pads. They are often presented in a credit card format but they also exist in formats of very small dimensions, such as memory cards, when they are intended to be inserted into portable electronic apparatus or as SIM cards ("Subscriber Identity Module") fitted to portable telephone apparatus.

Memory keys are units for storing computer data of very low weight and small proportions, approaching the dimensions of a cigarette lighter or of a pen, easily kept in a garment pocket and hooking up to a personal computer socket. They allow anyone to transport his own computer data in order to utilize the latter on computers encountered by chance. Their small proportions and their ease of use mean that they have become widespread in the pockets of the public and are tending to become a commonplace object in the same way as a pen.

The most commonplace memory keys connect to sockets with the standards of the communication buses of USB type ("Universal Serial Bus") which have the advantage of providing a power source. They consist of an EPROM or EEPROM memory associated with a microcontroller ensuring memory management and conversion of the data streams to the standards of the USB bus, and of a plug-in connector of USB type, the whole mounted on a printed circuit of very small dimensions and placed in a small stick-shaped casing from which the USB connector protrudes.

The format of USB memory keys being much in vogue, memory card readers with the format of a USB memory key are also found on the market. These readers comprise a tubular casing analogous to that of a USB memory key, with a slot or hatch affording access to an internal connector suited to the type of memory card concerned. The memory card is inserted into the casing through the slot or through the hatch and takes the place of the EPROM or EEPROM memory present in a conventional memory key.

Intelligent chip cards with electrical contact pads disposed in memory key casings provided with a USB connector and with a microcontroller ensuring the conversion of intelligent chip card/USB bus communication standards are also found.

The format of the USB memory keys being further in vogue, intelligent chip card readers disposed in casings with the format of a USB memory key are also found on the market, the chip card being inserted into the casing extended by a USB connector, like a memory card, through a slot or through a hatch affording access to an internal connector ensuring its hookup to a microcontroller housed in the casing and suitably adapted to the type of intelligent chip card concerned.

Small-size chip cards, hereinafter termed "chip microcards", of memory card or intelligent chip card type, pose their users the problem of accommodating them when they are not permanently disposed in a portable electronic apparatus. Specifically, seeing that their dimensions are of the order of those of a postage stamp, they are difficult to retrieve from the bottom of pockets and easy to mislay.

Memory keys, which are of the size of a cigarette lighter or small pen, do not suffer from this accommodation problem, all the more so as their casings are often equipped with a chain clasp enabling them to be suspended from the owner's neck.

The aim of the invention is to facilitate the accommodation, transport and use by its owner of a chip microcard, profiting from the wide circulation of memory keys amongst the public.

Its aim is also to make it possible to associate, in one and the same packaging, an intelligent chip microcard and an electronic key with the format of a memory key that are dedicated to the securing of transactions pertaining to one and the same banking or other service, provided by a computerized provider system to one and the same authorized proprietor, the chip card hooking up to the computer system of the service provider by way of a specialized terminal and the electronic key by way of a personal computer or any other electronic apparatus linked to the Internet network.

SUMMARY OF THE INVENTION

The subject of the invention is a casing, for electronic key with connector, comprising a main housing for the whole collection of electronic circuits of the key that are hooked up to the connector which remains accessible from outside the casing, noteworthy in that it furthermore comprises an accessory housing, without electrical hookup, for accommodating a chip microcard.

The accessory accommodation housing affords the owner of an electronic key equipped with such a casing a convenient location for accommodating a chip microcard, allowing him to retrieve it easily in all circumstances.

Advantageously, the accessory accommodation housing is a cavity having a profile suited to a particular chip microcard profile and comprising snap-fastening retaining means coming to bear on the edges of a chip microcard introduced into the cavity.

Advantageously, the accessory accommodation housing is a cavity open toward the outside, provided with retaining means holding the intelligent chip card in a position in which its electrical contact pads remain accessible from outside the key for a chip card reader terminal.

Advantageously, the accessory accommodation housing is a closed cavity provided with a slot allowing the introduction of a chip microcard.

Advantageously, the casing comprises means for extracting a chip microcard from the accessory accommodation housing.

Advantageously, the extraction means consist of a lever articulated with a pushrod acting on a motion reversing cam bearing on the edge of a chip microcard, opposite to the direction of insertion.

Advantageously, the accessory accommodation housing is a cavity provided with a removable and snap-fastenable cover.

Advantageously, the accessory accommodation housing is dimensioned for a chip microcard with a smaller format than the ID-1 format defined in the ISO7816 standard, for example with the ID-000 format.

Advantageously, the accessory accommodation housing is dimensioned for a chip microcard with the MMC or RS-MMC format.

Advantageously, the accessory accommodation housing is dimensioned for a chip microcard with the SD format.

The subject of the invention is also a system comprising a casing, for electronic key with connector, with a main housing for a collection of electronic circuits hooked up to the connector which remains accessible from outside the casing and an accessory housing for accommodating a chip microcard, and electronic circuits placed in the main housing of the casing and hooked up to the connector, and able to participate, by way of the connector plugged into a socket of a host electronic apparatus linked to a communication network, in transactions pertaining to a service provided by a computerized provider system linked to the communication network.

Advantageously, the collection of electronic circuits placed in the main housing of the casing help with the securing of the transactions.

Advantageously, the system furthermore comprises an intelligent chip microcard placed in the accessory accommodation housing of the casing able to secure transactions pertaining to the same service as those in which the electronic circuits placed in the main housing of the casing participate.

Advantageously, the intelligent chip microcard and the electronic circuits placed in the main housing of the casing are able to secure transactions pertaining to one and the same service provided by a computerized provider system to an authorized proprietor.

Advantageously, the intelligent chip microcard and the electronic circuits, placed in the main housing of the casing, which are able to secure transactions pertaining to one and the same service provided by a computerized provider system to one and the same authorized proprietor recognized by the computer system of the provider by identifier means, comprise, each on their side, non-volatile memory circuits, of which at least a part with secure access stores the identifiers necessary for the secure transactions, including the identifier of the authorized proprietor.

Advantageously, the intelligent chip microcard and the electronic circuits placed in the main housing of the casing comprise, each on their side, cryptographic calculation units.

Advantageously, the intelligent chip microcard and the electronic circuits placed in the main housing of the casing comprise, each on their side, cryptographic calculation units and non-volatile memory circuits, of which at least a part with secure access stores encryption keys.

Advantageously, the system comprises an intelligent chip microcard in accordance with the ISO 7816 standard.

Advantageously, the system comprises an intelligent chip microcard with antenna in accordance with the ISO 14443 standard.

Advantageously, the system comprises an intelligent chip microcard with antenna in accordance with the MMC standard.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

a FIG. 1 shows a USB key provided with a casing according to the invention exhibiting an accessory housing for accommodating a chip microcard, a FIG. 2 shows a variant of the USB key represented in FIG. 1, with a casing according to the invention exhibiting an accessory housing for accommodating a chip microcard and provided with a snap-fastenable cover.

DETAILED DESCRIPTION OF THE INVENTION

Figure 1:
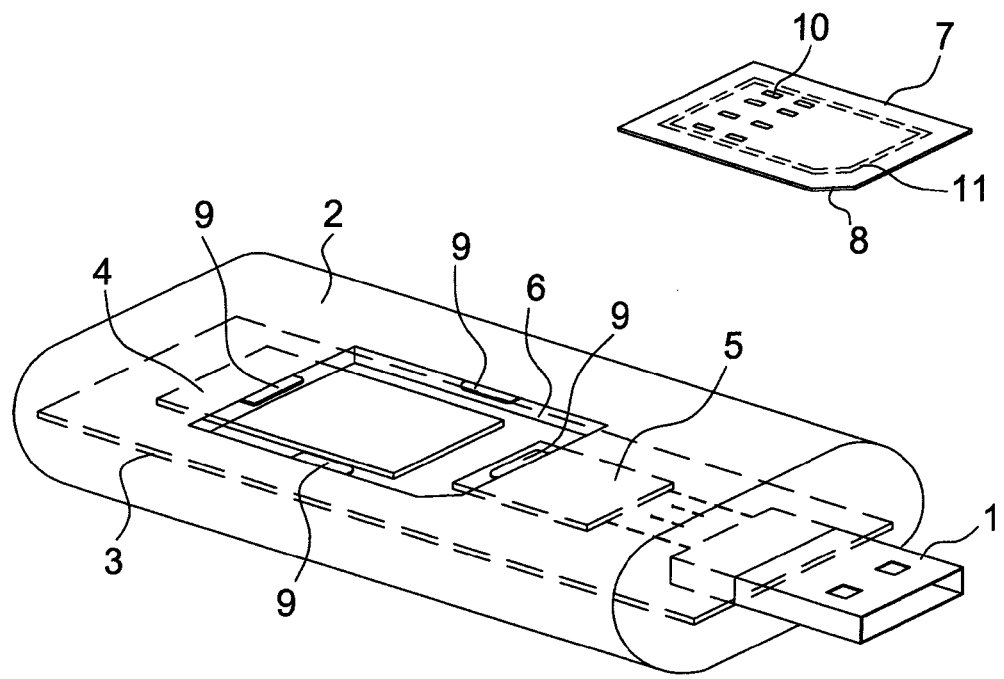

As shown in FIG. 1, the USB memory key takes the form of a plug-in connector 1 with the standards of the USB communication bus extended by a flattened tubular casing 2. The casing 2 comprises, as is customary, a main housing enclosing a printed circuit 3 of very small dimensions supporting the plug-in connector 1 which is mounted so as to be accessible from the outside, the whole collection of electronic components of the key together with the plug-in connector 1, here mainly an EEPROM memory 4 often termed a flash memory, and a microprocessor 5 fulfilling the functions of a memory controller, and their wire leads.

In addition to the main housing, the casing 2 exhibits an accessory housing 6 for accommodating a chip microcard 7 with no electrical connection with the electronic components 4, 5 of the key that are attached to the plug-in connector 1. This accessory accommodation housing 6 is a cavity with the dimensions of the chip microcard 7, the shape of whose polarizer contour 8 it matches. This cavity 6 is provided on its inside perimeter with retaining bosses 9 exhibiting a certain elasticity and gripping by snap-fastening onto the edge of a chip microcard 7 to hold it in place once it has been introduced.

The chip microcard 7 shown just before it is introduced into the accessory accommodation housing 6 is an intelligent chip microcard in accordance with the ISO 14443 standard, exhibiting, on its face turned away from the USB memory key, a set 10 of electrical contact pads, surrounded by a loop antenna 11 allowing its optional hookup to a chip card reader computer terminal, either through contacts by means of a suitable connector, or by proximity, by means of a link through electromagnetic waves. The polarizer shape of the perimeter of the cavity of the accessory accommodation housing 6 permits the chip microcard 7 only the position in which its face equipped with the set 10 of electrical contact pads and the loop antenna 11 is turned toward the outside of the USB memory key. This enables reading of the chip microcard 7 left in place in the accessory accommodation housing 6 of the USB memory key, by a chip card reader designed with a set of movable electrical contacts, placed at the level of the set 10 of contact pads of the chip card, in the wall of a chip card introduction housing suited to the profile of the USB memory key. This also facilitates the proximity reading of the chip card in place in the accommodation housing 6 of the USB memory key by leaving the field free to its antenna 11.

Figure 2:
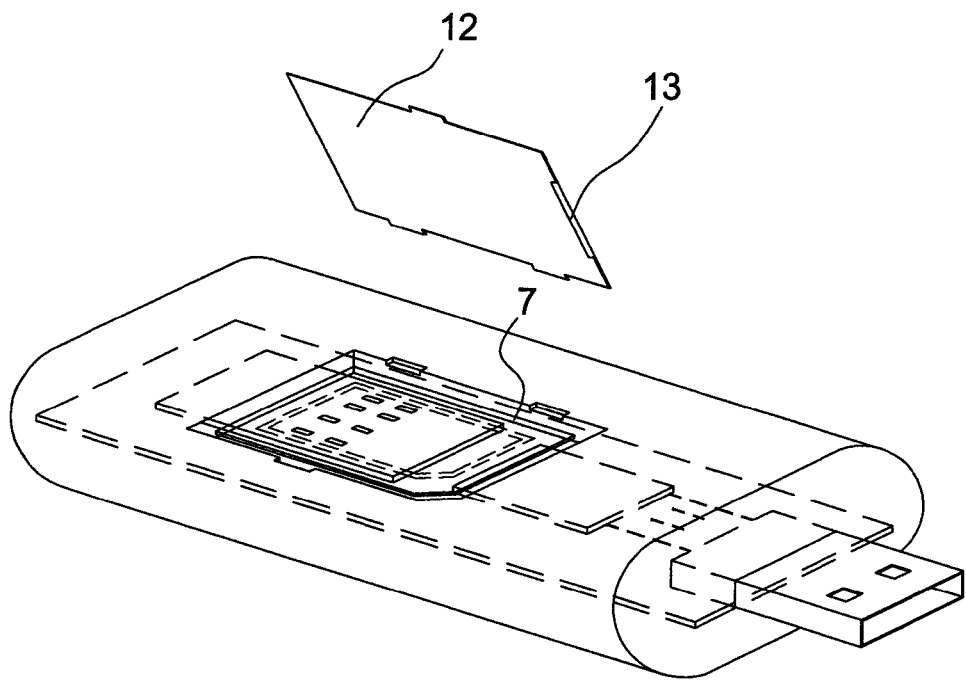

As a variant, as shown in FIG. 2, the accessory accommodation housing 6 can be closed by a snap-fastenable hatch 12 with a grasping notch 13, made of a material transparent to electromagnetic waves so as to prevent it from obstructing the proximity reading of a chip card 7 placed inside.

Figure 3:
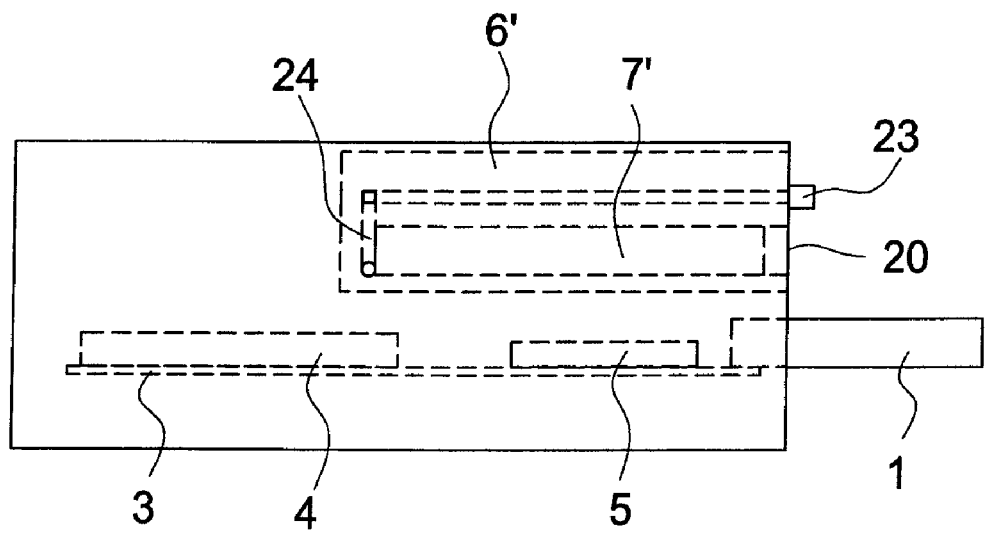
FIGS. 3 and 4 are profile and plan views of a USB key provided with another casing according to the invention exhibiting an accessory accommodation housing provided with a mechanism for extracting the chip card.
Figure 4:
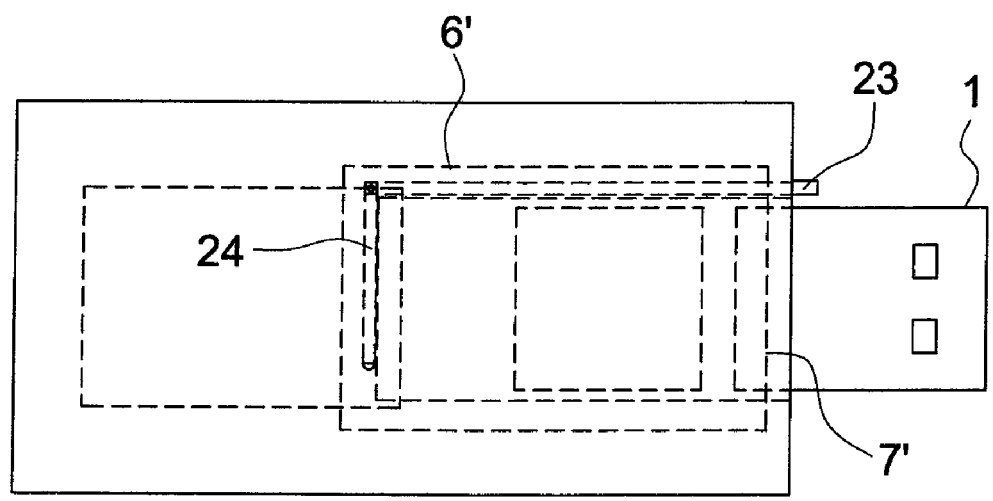

FIGS. 3 and 4 illustrate a variant USB memory key with a casing provided with an accessory accommodation housing provided with a lever-based extraction mechanism.

The accessory accommodation housing 6' is intended to receive an extractible intelligent chip microcard 7', introduced from outside the casing through a slot 20. A lever-based extraction mechanism consisting of a pushrod 23 articulated on a motion reversing cam pivoting about an axis secured to the casing and bearing on the edge of the chip microcard, opposite to the direction of insertion, makes it possible to remove a chip card from the first chamber 60 when the need is felt.

The accessory accommodation housing 6 is preferably dimensioned for an intelligent chip microcard with secure microprocessor complying at least in part with the ISO7816 standard, having a smaller format than the ID-1 format defined in this ISO7816 standard such as for example the ID-000 format again defined in this same standard. It can also be dimensioned for a chip microcard with the MMC format ("MultiMedia Card"), RS-MMC format ("Reduced Size-MultiMedia card") or SD format ("Secure Digital").

The USB key casings which have just been described afford the owner of a USB key a convenient location for accommodating a chip microcard, allowing him to retrieve it easily in all circumstances. They have the additional advantage of making it possible to associate, in one and the same packaging, while being separable and with no electrical connection between them, an intelligent chip microcard and an electronic key that are dedicated to transactions pertaining to one and the same proprietor and to one and the same banking or other service.

In the case of a banking service, and more particularly of the management of a bank account, the intelligent chip microcard allows its proprietor to manage the monetary flows of the account: purchases from traders, cash withdrawals, etc., by way of specialized terminals for chip card reading that are hooked up to the service provider's computer system while the electronic key can serve for consultation and for various operations for managing this account, by way of a host electronic apparatus such as a personal computer, a personal assistant, a portable telephone, etc., linked to the Internet network.

In such a system with independent and separable electronic chip card and key associated in one and the same casing and dedicated to the transactions of one and the same service provided to one and the same authorized proprietor, by the computer system of a provider hooked up to the Internet network and to a network of chip card reader terminals, the intelligent chip microcard 7 placed in the accessory accommodation housing 6, 6' and the electronic circuits 4, 5 placed in the main housing of the casing and hooked up to the connector 1 store, each on their side, the same identifiers, for example a bank account number or a telephone number put into the form of an IMSI (the acronym being short for: "International Mobile Subscriber Identity") in a non-volatile memory part with or without secure access.

The key's electronic circuits 4, 5 placed in the main housing of the casing can be those of a simple memory key with, optionally, a part with secure access since the intelligence of the transaction management can be sited remotely at the level of the microprocessor of the host electronic apparatus. They can also comprise, as well as the intelligent chip microcard 7, secure microcontrollers (5 for the key) provided with cryptographic calculation units which, in order to store one or more encryption keys, use the parts with secure access of the memory circuits.

In a preferential manner, an electronic key is dedicated non-exclusively to the transactions of the service controlled by the intelligent chip microcard and continues to fulfill the usual function of storing data for information exchanges between personal computers.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A casing for an electronic key with a connector, said casing comprising:
   a main housing for a whole collection of electronic circuits of the key hooked up to the connector which is accessible from outside the casing; and
   an accessory accommodation housing arranged in the main housing and adapted to accommodate a chip microcard without electrical hookup.

2. The casing as claimed in claim 1, wherein the accessory accommodation housing is a cavity having a profile suited to a particular chip microcard profile and comprises snap-fastening retaining member adapted to bear on edges of the chip microcard introduced into the cavity.

3. The casing as claimed in claim 1, wherein the chip microcard that is adapted to be received in the accessory accommodation housing has a polarizer profile and has a set of electrical contact pads on a face, and
   wherein the accessory accommodation housing is a cavity open toward the outside and having a contour suited to the polarizer profile of the chip microcard tolerating the chip microcard only in a position in which the face of the chip microcard equipped with the set of electrical contact pads is toward the outside so that the set of electrical contact pads remains accessible from outside.

4. The casing as claimed in claim 1, wherein the chip microcard that is adapted to be received in the accessory accommodation housing has a polarizer profile and has an antenna for electrical power supply and communication, and
wherein the accessory accommodation housing is a cavity open toward the outside and having a contour suited to the polarizer profile of the chip microcard tolerating the chip microcard only in a position in which the antenna remains pointing toward the outside.

5. The casing as claimed in claim 1, wherein the accessory accommodation housing is a closed cavity provided with a slot allowing the introduction of the chip microcard.

6. The casing as claimed in claim 1, wherein the accessory accommodation housing is provided with an extraction member that includes a pushrod connected with a motion reversing cam pivoting about an axis and secured to the casing, said cam bearing on an edge of the chip microcard, opposite to an insertion direction of the chip microcard.

7. The casing as claimed in claim 1, further comprising a removable and snap-fastenable cover; wherein the accessory accommodation housing is a cavity that is configured to be covered by the removable and snap-fastenable cover.

8. The casing as claimed in claim 1, wherein the accessory accommodation housing is dimensioned for a chip microcard with a smaller format than the ID-1 format defined in the ISO7816 standard.

9. The casing as claimed in claim 1, wherein the accessory accommodation housing is dimensioned for a chip microcard with the ID-000 format defined in the ISO7816 standard.

10. The casing as claimed in claim 1, wherein the accessory accommodation housing is dimensioned for a chip microcard with the format defined in the MMC standard.

11. The casing as claimed in claim 1, wherein the accessory accommodation housing is dimensioned for a chip microcard with the SD format.

12. A system comprising
a casing as claimed in claim 1; and
the electronic circuits placed in the main housing of the casing and hooked up to the connector, and configured to participate, by way of the connector plugged into a socket of a host electronic apparatus linked to a communication network, in transactions pertaining to a service provided by a computerized provider system linked to the communication network.

13. The system as claimed in claim 12, wherein the electronic circuits placed in the main housing of the casing participate in the securing of the transactions.

14. The system as claimed in claim 12, further comprising an intelligent chip microcard placed in the accessory accommodation housing of the casing and configured to participate in transactions pertaining to the same service as the transactions in which the electronic circuits placed in the main housing of the casing participate.

15. The system as claimed in claim 14, wherein the intelligent chip microcard and the electronic circuits placed in the main housing of the casing are configured to secure transactions pertaining to one and the same service provided by a computerized provider system to an authorized proprietor.

16. The system as claimed in claim 14, wherein the intelligent chip microcard and the electronic circuits placed in the main housing of the casing are configured to secure transactions pertaining to one and the same service provided by a computerized provider system to one and the same authorized proprietor recognized by an identifier device by the computerized provider system.

17. The system as claimed in claim 16, wherein the intelligent chip microcard and the electronic circuits placed in the main housing of the casing store the same identifiers.

18. The system as claimed in claim 17, wherein the intelligent chip microcard and the electronic circuits placed in the main housing of the casing store the same identifiers put into IMSI form.

19. The system as claimed in claim 14, wherein the intelligent chip microcard and electronic circuits placed in the main housing of the casing are configured to secure transactions pertaining to one and the same service provided by a computerized provider system to an authorized proprietor recognized by an identifier device,
wherein the chip microcard and the electronic circuits placed in the main housing of the casing comprise, each on a side of the chip microcard and the electronic circuits, non-volatile memory circuits, of which at least a part with secure access stores the identifiers necessary for the controlled transactions.

20. The system as claimed in claim 19, wherein the intelligent chip microcard and electronic circuits placed in the main housing of the casing store, each on a side of the chip microcard and the electronic circuits, the same identifiers.

21. The system as claimed in claim 14, wherein the intelligent chip microcard and the electronic circuits placed in the main housing comprise, each on a side of the chip microcard and the electronic circuits, cryptographic calculation units.

22. The system as claimed in claim 14, wherein the intelligent chip microcard and the electronic circuits placed in the main housing comprise, each on a side of the chip microcard and the electronic circuits, cryptographic calculation units and non-volatile memory circuits, of which at least a part with secure access stores encryption keys.

23. The system as claimed in claim 14, wherein the intelligent chip microcard complies with the ISO 7816 standard.

24. The system as claimed in claim 14, wherein the intelligent chip microcard is a chip card with antenna in accordance with the ISO 14443 standard.

25. The system as claimed in claim 14, wherein the intelligent chip microcard complies with the MMC standard.

26. A casing for an electronic key with a connector, said casing comprising:
a main housing for a whole collection of electronic circuits of the key hooked up to the connector which is accessible from outside the casing; and
an accessory accommodation housing arranged in the main housing and adapted to accommodate a chip microcard without electrical hookup between the chip microcard and the connector when the chip microcard is placed in the accessory accommodation housing,
wherein the chip microcard that is adapted to be received in the accessory accommodation housing has a polarizer profile and has a set of electrical contact pads on a face, and
wherein the accessory accommodation housing is a cavity open toward the outside and having a contour suited to the polarizer profile of the chip microcard tolerating the chip microcard only in a position in which the face of the chip microcard equipped with the set of electrical contact pads is toward the outside so that the set of electrical contact pads remains accessible from the outside.

* * * * *